(12) United States Patent
Al-Hallaj et al.

(10) Patent No.: US 6,942,944 B2
(45) Date of Patent: Sep. 13, 2005

(54) BATTERY SYSTEM THERMAL MANAGEMENT

(75) Inventors: Said Al-Hallaj, Chicago, IL (US); Jan Robert Selman, Chicago, IL (US)

(73) Assignee: Illinois Institute of Technology, Chicago, IL (US)

( * ) Notice: Subject to any disclaimer, the term of this patent is extended or adjusted under 35 U.S.C. 154(b) by 356 days.

(21) Appl. No.: 10/274,248

(22) Filed: Oct. 18, 2002

(65) Prior Publication Data

US 2003/0054230 A1 Mar. 20, 2003

Related U.S. Application Data

(63) Continuation-in-part of application No. 09/515,268, filed on Feb. 29, 2000, now Pat. No. 6,468,689.

(51) Int. Cl.[7] ............................................. H01M 10/50
(52) U.S. Cl. ........................................ 429/120; 429/62
(58) Field of Search ................................. 429/62, 120

(56) References Cited

U.S. PATENT DOCUMENTS

| | | |
|---|---|---|
| 3,780,356 A | 12/1973 | Laing |
| 4,057,104 A | 11/1977 | Altoz |
| 4,329,407 A | 5/1982 | Gross et al. |
| 4,332,866 A * | 6/1982 | Jacquelin et al. ............. 429/50 |
| 4,389,533 A | 6/1983 | Ames |

(Continued)

FOREIGN PATENT DOCUMENTS

| | | |
|---|---|---|
| DE | 42 30 583 | 3/1994 |
| GB | 2289976 | 6/1995 |
| JP | 58 166679 | 10/1983 |
| JP | 358166679 | 10/1983 |
| JP | 61 218072 | 9/1986 |
| JP | 09 270263 | 10/1997 |

OTHER PUBLICATIONS

Tanaka et al.: *Year 2000 R&D status of large–scale lithium ion secondary batteries in the national project of Japan*, Journal of Power Sources 97–92 (2000), 2–6.

*Primary Examiner*—Mark Ruthkosky
(74) *Attorney, Agent, or Firm*—Pauley Petersen & Erickson

(57) ABSTRACT

Power supply systems and associated methods of operation are provided based on the incorporation of a supply of phase change material in thermal contact with at least one cell element capable of a heat-generating charge or discharge of power. Also disclosed, such as for increased or improved heat transfer and dissipation, is battery module incorporation of a heat-conductive containment lattice member such as having a plurality of openings wherein at least a portion of the supply of the phase change material can be disposed as well as the inclusion of a plurality of module housing-protruding heat transfer fins.

29 Claims, 11 Drawing Sheets

U.S. PATENT DOCUMENTS

| | | | |
|---|---|---|---|
| 4,413,157 A | 11/1983 | Ames | |
| 4,477,546 A | 10/1984 | Wheeler et al. | |
| 4,629,622 A | 12/1986 | Yonezu et al. | |
| 4,650,727 A | 3/1987 | Vanderborgh et al. | |
| 4,883,726 A * | 11/1989 | Peled et al. | 429/120 |
| 4,977,041 A | 12/1990 | Shiozawa et al. | |
| 5,066,337 A | 11/1991 | Bhandari et al. | |
| 5,071,652 A | 12/1991 | Jones et al. | |
| 5,158,841 A | 10/1992 | Mennicke | |
| 5,224,356 A | 7/1993 | Colvin et al. | |
| 5,272,491 A | 12/1993 | Asakawa et al. | |
| 5,285,559 A | 2/1994 | Thompson et al. | |
| 5,326,656 A | 7/1994 | Meadows et al. | |
| 5,343,368 A | 8/1994 | Miller | |
| 5,353,867 A | 10/1994 | Jaspers | |
| 5,401,589 A | 3/1995 | Palmer et al. | |
| 5,405,718 A | 4/1995 | Hashemi | |
| 5,441,575 A | 8/1995 | Underwood et al. | |
| 5,441,824 A | 8/1995 | Rippel | |
| 5,449,571 A | 9/1995 | Longardner | |
| 5,505,788 A | 4/1996 | Dinwoodie | |
| 5,552,961 A | 9/1996 | Van Gaal et al. | |
| 5,557,208 A | 9/1996 | Parker | |
| 5,593,792 A | 1/1997 | Farrier et al. | |
| 5,608,181 A | 3/1997 | Yasuda | |
| 5,614,332 A | 3/1997 | Pavelle et al. | |
| 5,871,859 A | 2/1999 | Parise | |
| 5,895,728 A | 4/1999 | Walker et al. | |
| 6,033,800 A | 3/2000 | Ichiyanagi et al. | |
| 6,059,016 A | 5/2000 | Rafalovich | |
| 6,087,038 A * | 7/2000 | Flament et al. | 429/120 |
| 6,106,972 A | 8/2000 | Kokubo et al. | |
| 6,140,266 A | 10/2000 | Corrigan et al. | |
| 6,146,779 A | 11/2000 | Walsh | |
| 6,159,434 A | 12/2000 | Gonjo et al. | |
| 6,203,948 B1 | 3/2001 | Kao et al. | |
| 6,220,337 B1 | 4/2001 | Chen et al. | |
| 6,245,462 B1 | 6/2001 | Kao et al. | |
| 6,425,440 B1 | 7/2002 | Tsenter et al. | |
| 6,465,130 B1 | 10/2002 | Numata et al. | |
| 6,468,689 B1 * | 10/2002 | Hallaj et al. | 429/120 |
| 6,475,662 B1 | 11/2002 | Spencer | |
| 6,485,853 B1 | 11/2002 | Pettit et al. | |
| 6,570,362 B1 | 5/2003 | Estes et al. | |
| 6,797,427 B2 * | 9/2004 | Maleki et al. | 429/120 |
| 2001/0033961 A1 | 10/2001 | Gudmundsson et al. | |
| 2002/0104645 A1 | 8/2002 | Yoshida et al. | |
| 2002/0136937 A1 | 9/2002 | Kelley et al. | |
| 2002/0160237 A1 | 10/2002 | Johnson | |
| 2003/0020072 A1 | 1/2003 | Higgins | |
| 2003/0044682 A1 | 3/2003 | Park et al. | |
| 2003/0066638 A1 | 4/2003 | Qu et al. | |

* cited by examiner

BATTERY SYSTEM THERMAL MANAGEMENT

CROSS REFERENCE TO RELATED APPLICATION

This application is a continuation-in-part of U.S. application, Ser. No. 09/515,268, filed on 29 Feb. 2000. The co-pending parent application is hereby incorporated by reference herein in its entirety and is made a part hereof, including but not limited to those portions which specifically appear hereinafter.

BACKGROUND OF THE INVENTION

This invention relates generally to battery power supply and, more particularly, to thermal management in such battery power supply systems. The word "battery" here is meant to include various forms of electrochemical power generation which have in common that chemical energy, in the form of one or more chemical reactants stored in a confined space, react with each other or with an external reactant in an electrochemical reaction, so as to produce electric power when desired.

Various uses of battery power supplies have been well established. For example, the packaging together of a plurality of cells in a parallel or series configuration to form a battery module or pack for use as a power supply for personal electronic devices such as cell phones, lap top computers, camcorders or the like have become well-known and common. In addition, desirable properties or characteristics of battery power supplies including, for example, the capability of certain battery power supplies to be recharged makes such battery power supplies an attractive potential power source for vehicle propulsion, i.e., electric vehicles (EV). Recently, the concept as well as the application of battery power have been extended to include "fuel batteries" or "fuel cell batteries", in which a fuel cell reaction is used to generate electric power in a manner somewhat similar to that of a conventional rechargeable battery, but in which one of the reactants (the fuel) must be replenished from time to time.

In various such applications, it is common that a number of cells are packed together in a preselected configuration (e.g., in parallel or in series) to form a battery module. A number of such battery modules may, in turn, be combined or joined to form various battery packs such as are known in the art. During operation and discharge, such cells, battery modules or battery packs commonly produce or generate quantities of heat which can significantly detrimentally impact the performance that results therefrom. Thus, in order to maintain desired or optimal performance by such cells or resulting battery modules or battery packs, it is generally important to maintain the temperature of such cells, battery modules or battery packs within fairly narrow prescribed ranges.

In practice, temperature variations between individual cells can result from one or more of a variety of different factors including, for example:

1) changes in ambient temperature;
2) unequal impedance distribution among cells and
3) differences in heat transfer efficiencies among cells.

Differences in heat transfer efficiencies among cells can typically be primarily attributed to the cell pack configuration. For example, cell elements at the center of a module or cell pack configuration may tend to accumulate heat while those cell elements at the periphery of the module or cell pack configuration will generally tend to be more easily or freely cooled as a result of greater relative heat transfer to the surrounding environment. Further, such variation in heat transfer efficiencies may lead to further differences in impedance such as may serve to amplify capacity differences among the cells. Such capacity imbalances can cause or result in some cells being over-charged or over-discharged which in turn may result in premature failure of a specific cell element or of an associated cell pack or module. In particular, such failures may take the form of thermal runaway or accelerating capacity fading.

Thermal management systems based on the use of active cooling (e.g., such as based on forced circulation of air, liquid or other selected cooling medium) have been proposed for use in conjunction with such battery power supply systems. Specific forms or types of active cooling include: "internal active cooling" wherein a selected cooling medium is typically circulated internally within the battery module or pack and "external active cooling" wherein a selected cooling medium is typically circulated externally to the battery module. It will be appreciated, however, that the incorporation and use of internal active cooling regimes may introduce an undesired level of complexity in either or both power supply design and operation and such as may hinder or prevent the more widespread use of such corresponding power supply systems.

Further, the required or desired size of a battery power supply is generally dependent on the specific application thereof. Thus, certain contemplated or envisioned applications for such power supplies, such as to power electric vehicles, for example, may necessitate the use of such power supplies which have or are of significantly larger physical dimensions than those presently commonly used or available. As will be appreciated by those skilled in the art, thermal management in power supply systems can become even more critical or significant as the size of such cell, battery module, or battery pack is increased.

Thus, there is a need and a demand for new and improved power supply systems and methods of operation which permit either or both more efficient and effective thermal management. In particular, there is a need and a demand for such power supply systems and methods of operation which desirably avoid the potential complications and complexities of typically contemplated internal active cooling thermal management systems. Further, there is a need and a demand for a well designed thermal management system such as can desirably better ensure one or more of the performance, safety or capacity of an associated power supply.

SUMMARY OF THE INVENTION

A general object of the invention is to provide an improved power supply system and method of operation.

A more specific objective of the invention is to overcome one or more of the problems described above.

The general object of the invention can be attained, at least in part and in accordance with one embodiment of the invention, through a power supply system which includes at least one cell element capable of a heat-generating charge or discharge of electric power and a supply of phase change material in thermal contact with the at least one cell element whereby the phase change material absorbs at least a portion of the heat generated upon a discharge of power from the at least one cell element.

The prior art generally fails to provide a power supply system and method of operation which provides or results in thermal management which is either or both as effective and efficient as may be desired. Further, the prior art generally fails to provide power supply system thermal management and operation such as may more conveniently or effectively permit the use of larger-sized battery power supplies such as contemplated or envisioned for certain applications, such as to power electric vehicles, for example.

The invention further comprehends a method of operating a power supply system. In accordance with one embodiment of the invention, such a method includes discharging at least one cell element to produce a quantity of power and a quantity of heat. Alternatively, the charging of at least one cell element may similarly produce a quantity of heat. At least a portion of the quantity of heat is absorbed in a phase change material in thermal contact with the discharging cell element. Such method further includes subsequently releasing at least a portion of the absorbed quantity of heat from the phase change material to heat the at least one cell element.

In accordance with another embodiment, the invention provides a battery module which includes a housing and a plurality of electrochemical cell elements, capable of a heat-generating charge, contained within the housing. The battery module also includes a supply of a phase change material. The phase change material is contained within the housing in thermal contact with at least one of the plurality of electrochemical cell elements whereby the phase change material absorbs at least a portion of the heat generated upon a charge or discharge of electric power from the at least one of the plurality of electrochemical cell elements. The battery module further includes a heat-conductive containment lattice member also contained within the housing. The containment lattice member has a plurality of openings wherein at least a portion of the supply of the phase change material is disposed.

The invention also comprehends a method of operating a power supply system. In accordance with one embodiment of the invention, such a method includes discharging at least one cell element of a battery module to produce a quantity of power and a quantity of heat. At least a portion of the quantity of heat is absorbed in a phase change material in thermal contact with the discharging cell element with the phase change material disposed in a plurality of openings in a heat-conductive containment lattice member. Following discharge, at least a portion of the absorbed quantity of heat is released from the phase change material to heat the at least one cell element to a greater than ambient temperature. The heated at least one cell element is itself subsequently discharged.

Other objects and advantages will be apparent to those skilled in the art from the following detailed description taken in conjunction with the appended claims and drawings.

DETAILED DESCRIPTION OF THE INVENTION

The present invention generally provides an improved power supply system and method of operation. More particularly, the invention provides an improved power supply system and method of operation such that provide or result in improved thermal management such as wherein undesired temperature excursions and non-uniformity of temperature can be appropriately reduced, minimized or otherwise suitably managed.

Figure 1:
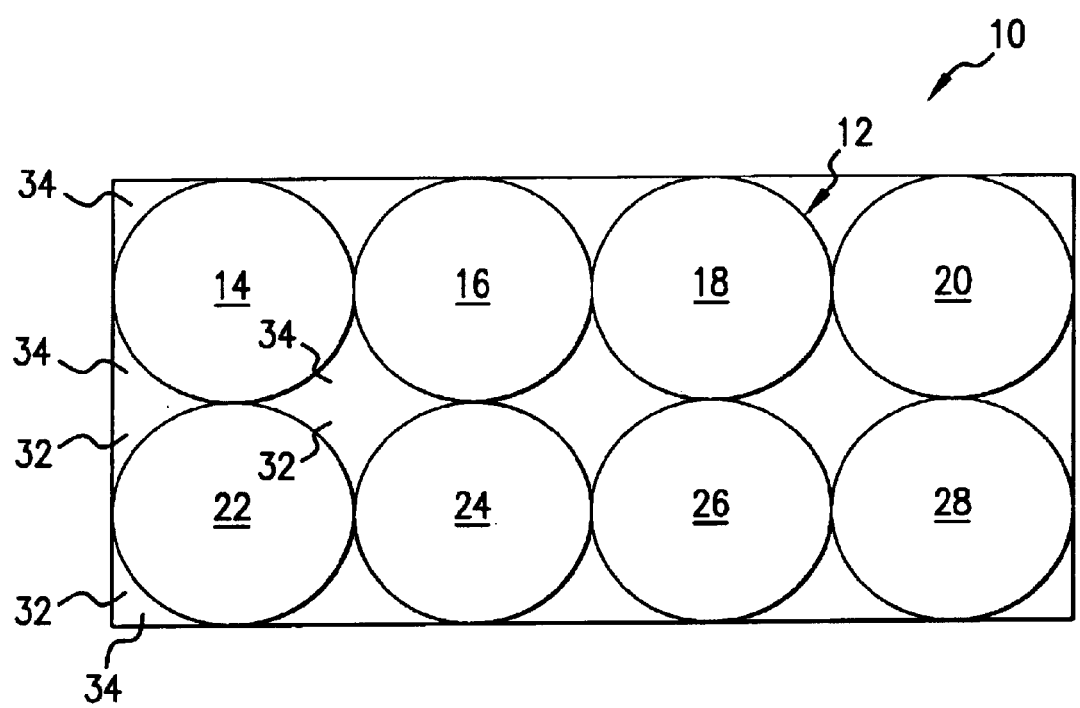
FIG. 1 is a top view schematic of a battery module incorporating a thermal management system in accordance with one embodiment of the invention.

The present invention may be embodied in a variety of different structures. As representative, FIG. 1 illustrates the present invention as embodied in a battery module, generally designated by the reference numeral 10. The battery module 10 includes a cell package 12 composed of eight (8) cell elements 14, 16, 18, 20, 22, 24, 26 and 28 such as known in the art.

Figures 2, 3:
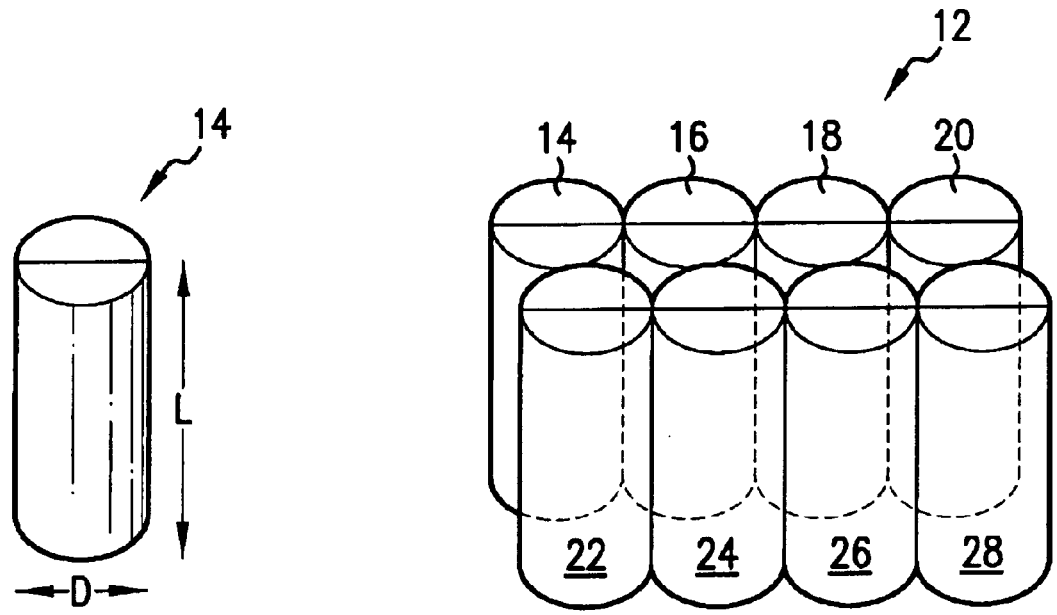
FIG. 2 is a perspective schematic of a cell element used in the battery module shown in FIG. 1.
FIG. 3 is a perspective schematic of the cell elements used in the battery module shown in FIG. 1.

FIG. 2 illustrates the cell element 14 in isolation and in greater detail. As shown, the cell element 14 has a generally cylindrical shape composed of a length L and a width D. While such shaped cell elements are common and well known, the broader practice of the invention is not necessarily so limited as cell elements having other desired shapes or sizes can, if desired, be used alone or in combination.

FIG. 3 illustrates the cell package 12 in isolation and in greater detail.

Returning to FIG. 1, the battery module 10 forms or includes void spaces, generally designated by the reference numeral 32, between the various adjacent cell elements 14, 16, 18, 20, 22, 24, 26 and 28 of the cell package 12.

In accordance with a preferred practice of the invention, such battery module voids are filled or otherwise appropriately contain a suitable phase change material (PCM), generally designated by the reference numeral 34 and such as described in greater detail below, such as to facilitate desired thermal management within such a power supply system. In particular, in the illustrated embodiment, the phase change material 34 surrounds each of the cell elements 14, 16, 18, 20, 22, 24, 26 and 28, and is in general thermal contact therewith.

In accordance with one preferred embodiment of the invention, the so included or incorporated phase change material 34 can desirably serve or act as a heat sink to absorb excess heat generated within the module 10 such as during the relatively highly exothermic process of battery discharge or charge. In particular, the heat generated from the cells 14, 16, 18, 20, 22, 24, 26 and 28 during discharge can be stored, at least temporarily in the phase change material 34 as latent heat.

Thus, the phase change material 34 permits the storage of such heat for later or subsequent use or utilization. For example, the heat stored or otherwise contained within such phase change material can later be appropriately released or, as commonly referred to, "rejected" for appropriate use in or in conjunction with the battery module 10. In particular, such stored heat can be appropriately rejected to the cell module during relaxation and keep the cells at an elevated temperature above the surrounding temperature for an extended period of time. For example, such heat can be later rejected such as when the battery temperature drops such as during battery charge or under cold weather conditions.

Various phase change materials, such as known in the art, can suitably be used in the practice of the invention. For example, suitable phase change materials for use in Li-ion battery applications desirably will have a melting point in the range of between about 30° C. and 60° C., a high latent heat per unit mass ratio, and a narrow melting temperature range. Further, phase change materials for use in the practice of the invention will also desirably be thermally cyclable, non-hazardous, non-contaminant, non-reactive or otherwise inert with respect to other battery components, nontoxic, cheap and of relatively light weight or density. Thus, suitable such phase change materials may generally include paraffin waxes such as are relatively inexpensive, not easily or prone to decomposition and which generally have a relatively low melting temperature within the recommended range of operation for Li-ion cells.

Alternatively, those skilled in the art and guided by the teachings herein provided will appreciate that chlorobenzene and bromobenzene crystallize with very similar structure and have a low and narrow temperature range of crystallization. Thus, mixtures of chlorobenzene and bromobenzene may be suitable for particular applications such as involving precise temperature control between about 30° C. to about 45° C., for example.

Other possible or suitable phase change materials for such applications may include stearic acid which has a melting point of about 70° C., and various commercially available esters of stearic acid with methyl, propyl and butyl alcohols, having melting points in the range of about 17° C. to about 34° C. Another candidate phase change material for use in the practice of the invention is polyethylene glycol (PEG). Potential or possible problems or concerns with thermal degradation by or of PEG may, however, prevent, limit or otherwise restrict such use or application. In view of the above, it is to be understood that the broader practice of the invention is not necessarily limited or restricted to the use of or the practice in conjunction with specific or particular phase change materials.

The present invention is described in further detail in connection with the following examples which illustrate or simulate various aspects involved in the practice of the invention. It is to be understood that all changes that come within the spirit of the invention are desired to be protected and thus the invention is not to be construed as limited by these examples.

EXAMPLES

Figure 4:
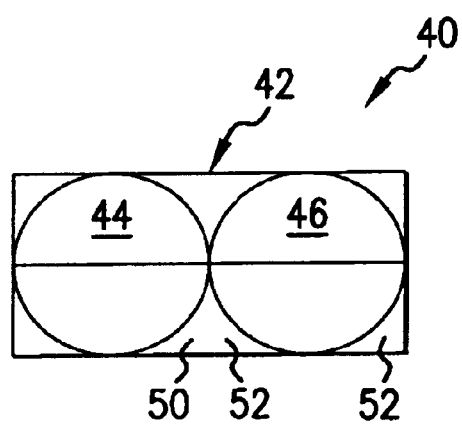
FIG. 4 is a top view schematic of a corner of the simulated battery module showing two cells out of eight total cells in the module.

For purposes of these simulation examples, a rechargeable battery module composed of eight (8) scaled-up prototype cells connected in series and similar in arrangement to the battery module 10 shown in FIG. 1 is assumed. This simulated battery module, generally designated by the reference numeral 40 and, specifically a corner 42 thereof which contains two cells (individually designated by the reference numeral 44 and 46, respectively) out of eight total cells is shown in FIG. 4. As will be appreciated, the corner pair of cells 44 and 46 generally correspond to any of the corner pairs of cells, e.g., 14 and 16; 18 and 20; 22 and 24; and 26 and 28, shown in FIGS. 1 and 3.

It is further assumed that the scaled-up prototype cells of which the simulated battery module 40 is composed have the same chemistry as a known cell for which thermophysical properties and heat generation rates per unit volume have previously been measured and can be used as inputs.

The voids 50 between the module cells 44 and 46 are, in accordance with the invention, assumed to be filled with a phase change material 52 such as to overcome anticipated overheating problems. For purposes of these simulation examples, a paraffin wax phase change material having the physical properties identified in TABLE 1 below is assumed.

TABLE 1

| Physical Properties of the Paraffin Wax Used in the Simulation | |
|---|---|
| Property | Value |
| Density of melted wax | 822 kg · m$^{-3}$ |
| Density of the solid wax | 910 kg · m$^{-3}$ |
| Melting Temperature | 56° C. |
| $C_p$ (melted wax) | 1770 J · kg$^{-1}$ · K$^{-1}$ |
| $C_p$ (solid wax) | 1770 J · kg$^{-1}$ · K$^{-1}$ |
| k (melt wax) | 0.21 W · m$^{-1}$ · K$^{-1}$ |
| k (solid wax) | 0.29 W · m$^{-1}$ · K$^{-1}$ |
| Latent heat of fusion | 195 kJ · kg$^{-1}$ |

A commercial two-dimensional finite element (FE) software program called PDEase2D™ by Macsyma Inc. was used to simulate the thermal behavior of the battery pack.

Results and Discussion

FIGS. 5–8 are graphical representations of the temperature profile across the corner 42 of the battery module 40, shown in FIG. 4, during discharge at selected discharge rates (C/1, C/2, C/3 and C/6, respectively, and each under a heat transfer coefficient, h=6.4 W·m$^{-2}$·K$^{-1}$, which generally corresponds to the natural cooling rate, that is without active cooling ) and at various selected Depths of Discharge (DOD). Results for the other three corner cell pairs are assumed to be the same because of module symmetry.

Figure 5:
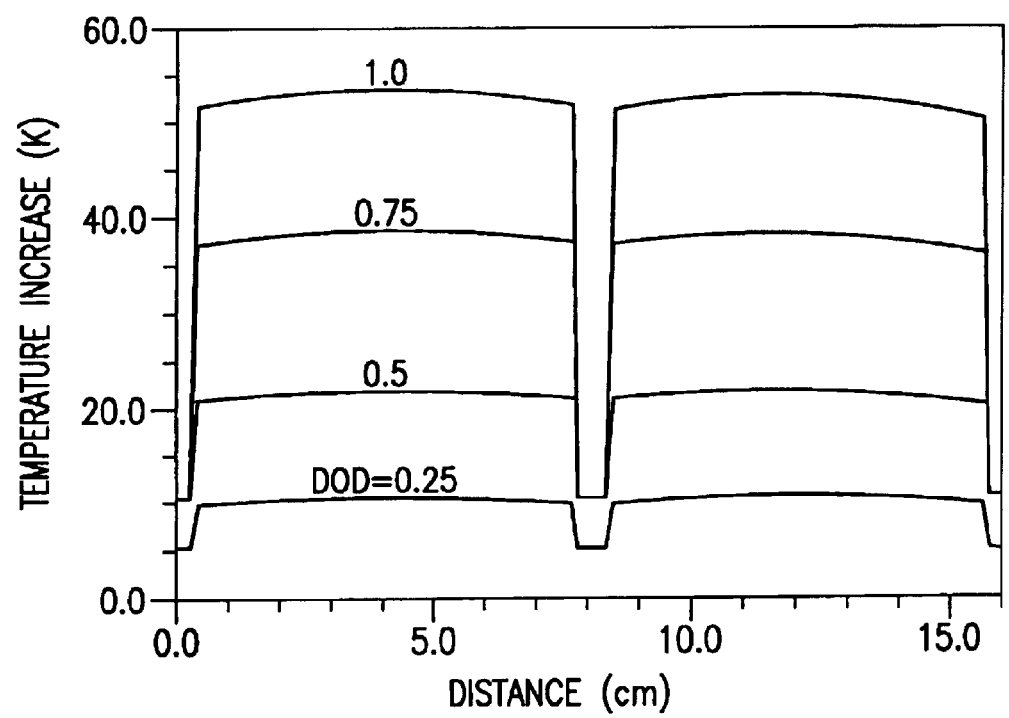
FIGS. 5–8 are graphical representations of the temperature profile across the corner of the battery module, shown in FIG. 4, during discharge at selected discharge rates and at various selected Depths of Discharge (DOD).

As shown in FIG. 5, the temperature rise at the center of both of the cells 44 and 46, at the end of discharge, is 53 K, while a temperature rise of only 11 K is realized for the PCM material. The temperature difference between the surface and the center of each of the cells is less than 2 K, at all DOD. The lower temperature rise in the phase change material is attributable to the latent heat of phase change which the phase change material undergoes. That is, most of the heat rejected by the module cells during discharge is stored as latent heat in the associated phase change material by changing the phase of this material, or a portion thereof, from solid to liquid. This stored heat can subsequently be released after the end of discharge such as during the time the cell is left to relax.

Figure 6:
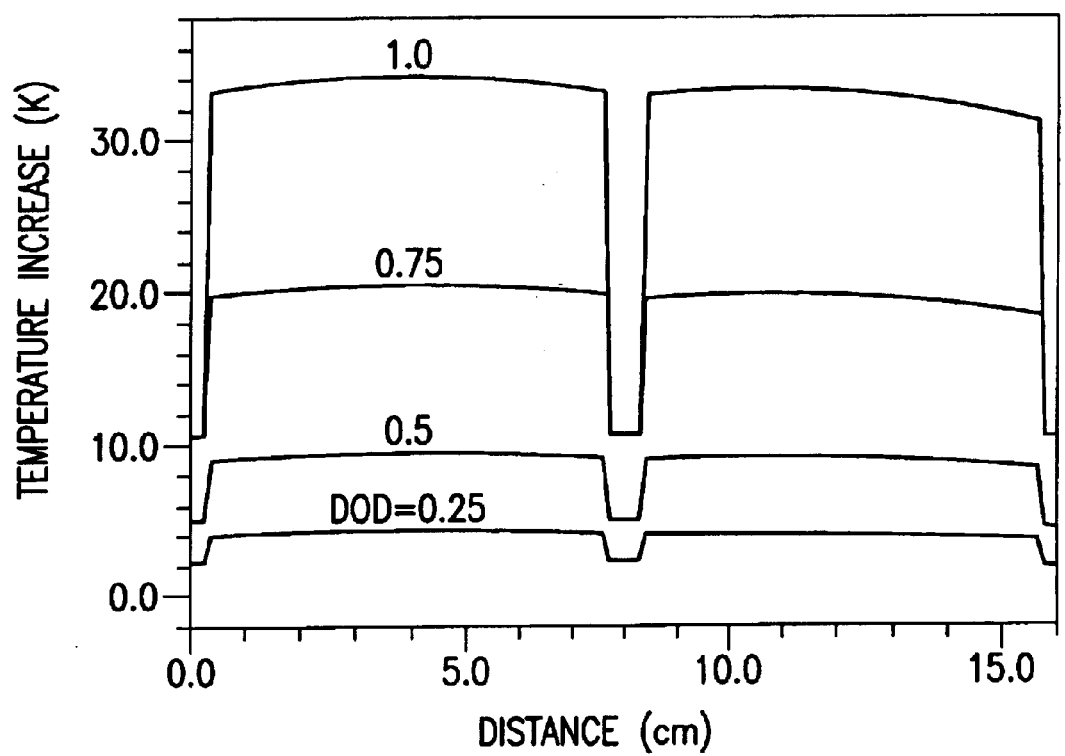
Figure 7:
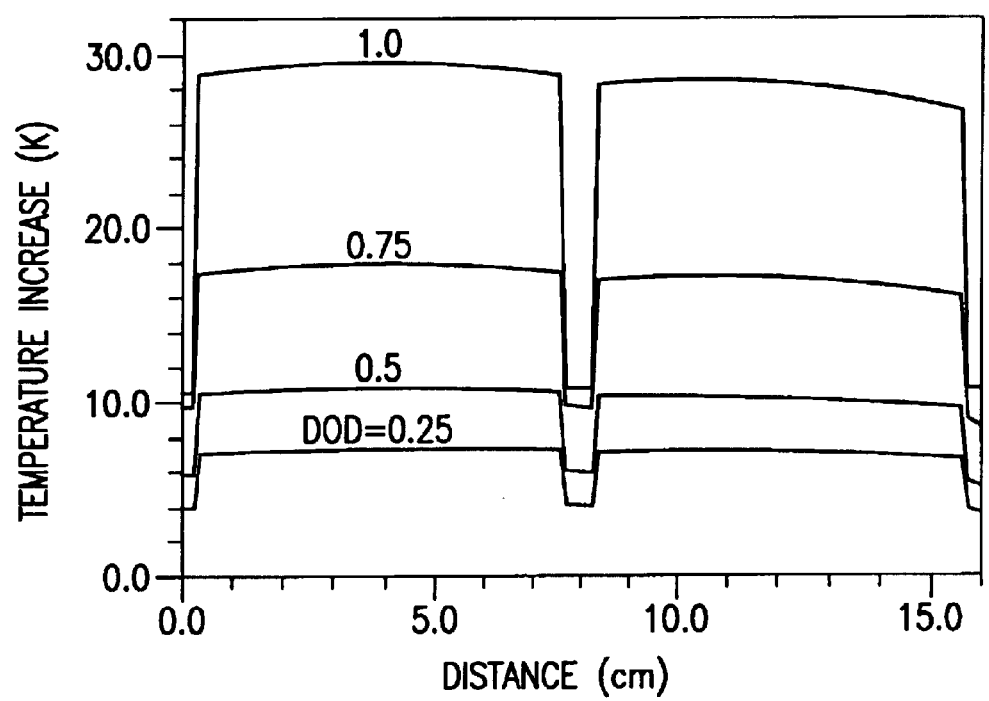
Figure 8:
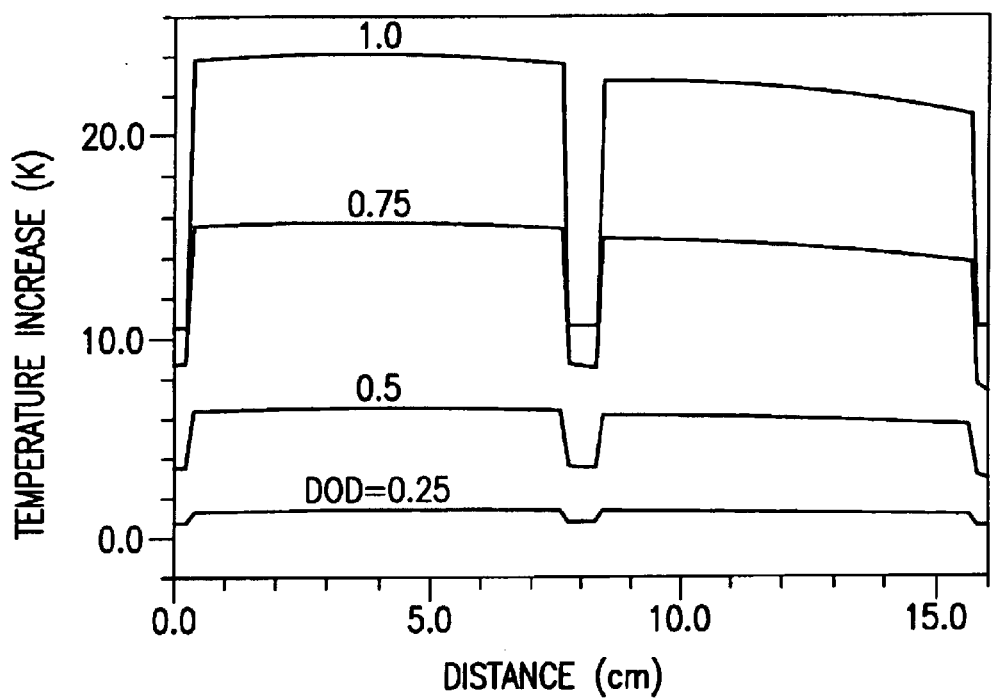

Similar results are found for the other discharge rates, as shown in FIGS. 6–8. The temperature rise at the center of both of the cells 44 and 46, at the end of discharge for the slower C/2, C/3 and C/6 discharge rates, are 34 K, 29 K and 24 K, respectively. Thus, as those skilled in the art and guided by the teachings herein provided will appreciate, discharge at a faster or greater rate generally results in increased heat generation and can thus heighten or increase the need for effective thermal management such as realizable with the implementation of the invention.

Figure 9:
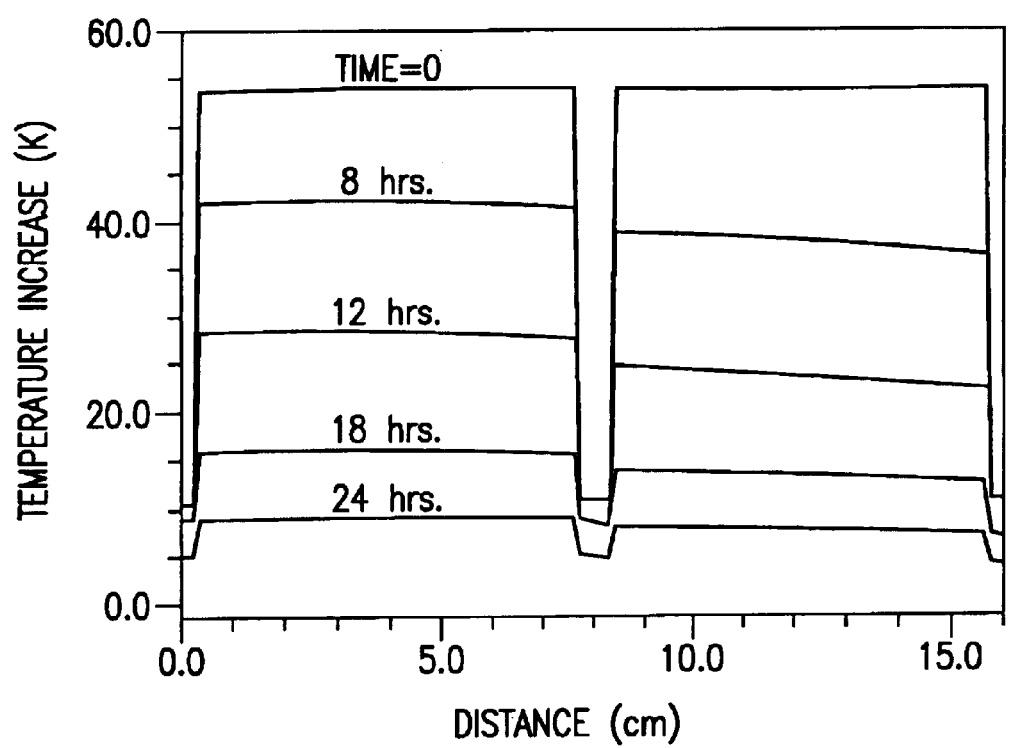
FIG. 9 is a graphical representation of the temperature profile across the corner of the battery module, shown in FIG. 4, at selected points in time during relaxation.

FIG. 9 is a graphical representation of the temperature profile across the corner 42 of the battery module 40, shown in FIG. 4, at selected points in time during relaxation. As shown, after 24 hours of relaxation, the temperature of each of the cells 44 and 46 was almost 10 K higher than the initial (surrounding) temperature. As will be appreciated, such performance can have significant design and use implications. For example, it has been shown that the utilized capacity of the Li-ion batteries is strongly dependent on temperature, especially at low operating temperatures. Thus, the utilized capacity of a corresponding battery can be significantly increased by elevating the cell temperature during operation. As another example, the performance of fuel batteries (fuel cell batteries) such as utilizing hydrogen or methanol fuel and operating with state-of-the-art solid polymer electrolyte has been shown to deteriorate severely beyond a certain maximum temperature. Therefore, rapid removal of heat developed during periods of high power output is necessary, which in a confined space can be achieved efficiently by a phase change material.

In view thereof and in accordance with one preferred embodiment of the invention, utilization of heat stored in an associated phase change material can enable the cells in the battery pack to stay at a higher temperature than the surrounding temperature during relaxation and hence increase the utilized capacity when the cell is then charged or discharged. Thus, the invention may have various significant practical applications such as with respect to batteries or cells used in an electric vehicle battery module when under cold conditions.

While such embodiments have proven helpful in providing a thermal management system such as can desirably better ensure one or more of the performance, safety or capacity of an associated power supply, further improvements have been sought and are desired. In particular, a shortcoming that has limited the greater or more widespread use of phase change materials such as paraffin wax is the relatively low thermal conductivity thereof. For example, as identified above in TABLE 1, paraffin wax has a thermal conductivity of only 0.29 W·m$^{-1}$·K$^{-1}$ when in a solid phase and a thermal conductivity of only 0.21 W·m$^{-1}$·K$^{-1}$ when in a liquid phase, after melting.

Figure 10:
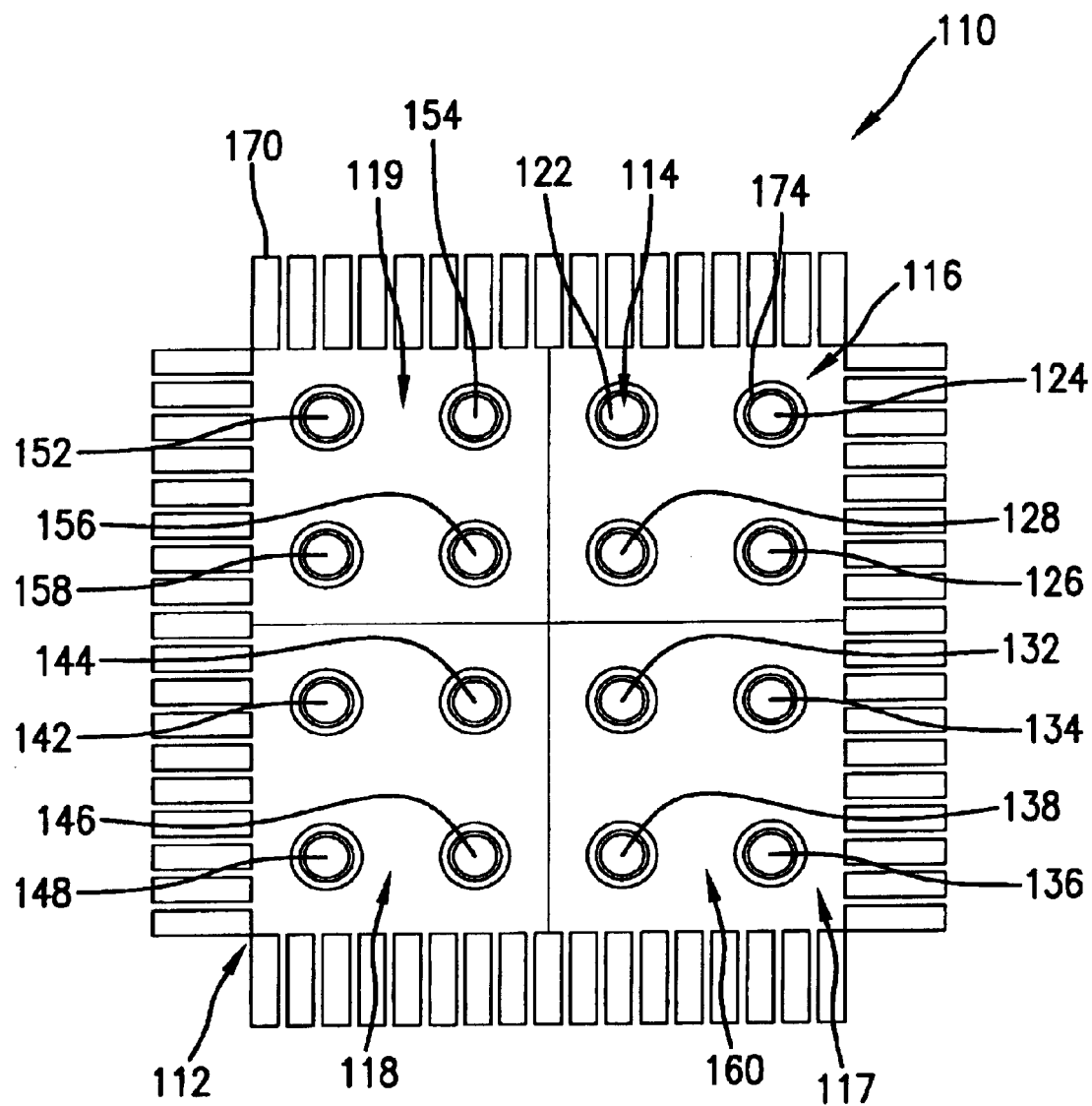
FIG. 10 is a top view schematic of a battery module incorporating a thermal management system in accordance with another embodiment of the invention.

In an effort to minimize or overcome such a shortcoming, it has been found desirable to incorporate a heat-conductive containment lattice member having a plurality of openings wherein at least a portion of the supply of the phase change material is disposed. Such invention can be embodied in a variety of different forms or structures. As representative, FIG. 10 illustrates a battery module, generally designated by the reference numeral 110 and incorporating a thermal management system in accordance one such embodiment of the invention. The battery module 110 generally includes a housing 112, such as made of plastic or other polymer and which is preferably electrically insulating, and a plurality of electrochemical cell elements, generally designated by the reference numeral 114, housed or contained within the module housing 112, as described below.

In the illustrated embodiment, the battery module 110 is divided into four generally equally shaped and sized module quadrants 116, 117, 118 and 119, respectively. Each of the module quadrants includes or contains four electrochemical cell elements 114. For example, the module quadrant 116 includes or contains the electrochemical cell elements 122, 124, 126 and 128; the module quadrant 117 includes or contains the electrochemical cell elements 132, 134, 136 and 138; the module quadrant 118 includes or contains the electrochemical cell elements 142, 144, 146 and 148; and the module quadrant 119 includes or contains the electrochemical cell elements 152, 154, 156 and 158.

In the illustrated embodiment, the cell elements are Li-ion cells each having a capacity of 1.8 Ah with a diameter (corresponding to D shown in FIG. 2) of 18 mm and a height or length (corresponding to L shown in FIG. 2) of 65 mm. The four cells in each of the module quadrants are connected in series and the four quadrants are in turn connected in parallel to provide or result in a total nominal capacity of 7.2 Ah and a total nominal voltage of 14.68 V.

Those skilled in the art and guided by the teachings herein provided will, however, appreciate that the broader practice of the invention is not necessarily limited by the size, shape, number, form or type of cell elements or the fashion or technique by which two or more of such cell elements or module units may be joined or connected.

Figure 11:
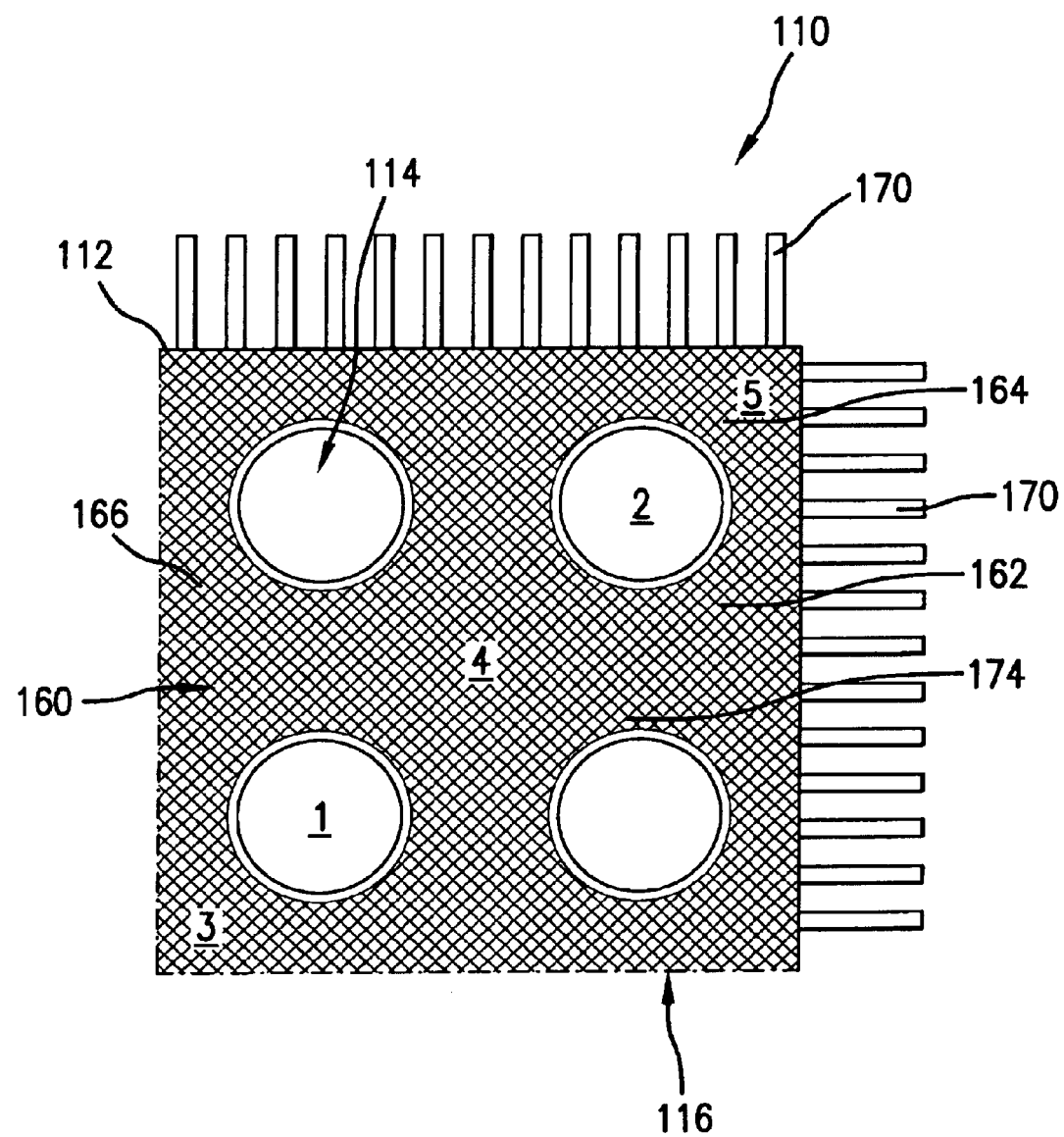
FIG. 11 is a top view schematic of a specified quadrant of the battery module shown in FIG. 10.

FIG. 11 illustrates the module quadrant 116 in isolation and in greater detail.

Returning to FIG. 10, the battery module 110 forms or includes void spaces, generally designated by the reference numeral 160, between the various cell elements 114. In accordance with a preferred practice of the invention, such battery module voids 160 are at least in part filled or otherwise appropriately contain a supply of a suitable phase change material (PCM), generally designated by the reference numeral 162 and such as described in detail above, such as to facilitate desired thermal management within such a power supply system.

As in various of the above-described embodiments, the phase change material 162 desirably surrounds and is in general thermal contact with the cell elements 114. The so included or incorporated phase change material 162 can desirably serve or act as a heat sink to absorb excess heat generated within the module 110 such as during the relatively highly exothermic process of battery discharge or charge, such as with the phase change material 162 desirably undergoing a reversible change of phase when absorbing or releasing a sufficient quantity of heat. In particular, the heat generated from the cells 114 during discharge can be stored, at least temporarily in the phase change material 162 as latent heat.

Thus, the phase change material 162 permits the storage of such heat for later or subsequent use or utilization. For example, the heat stored or otherwise contained within such phase change material can later be appropriately released or, rejected for appropriate use in or in conjunction with the battery module 110. In particular, such stored heat can be appropriately rejected to the cell module during relaxation and keep the cells at an elevated temperature above the surrounding temperature for an extended period of time. For example, such heat can be later rejected such as when the battery temperature drops such as during battery charge or under cold weather conditions.

As identified above, various phase change materials, such as known in the art, can suitably be used in the practice of the invention. For example and as identified above, suitable phase change materials for use in Li-ion battery applications desirably will have a melting point in the range of between about 30° C. and 60° C., a high latent heat per unit mass ratio, and a narrow melting temperature range. Further, phase change materials for use in the practice of the invention will also desirably be thermally cyclable, non-hazardous, non-contaminant, non-reactive or otherwise inert with respect to other battery components, nontoxic, cheap and of relatively light weight or density. Thus, suitable such phase change materials may generally include paraffin waxes such as are relatively inexpensive, not easily or prone to decomposition and which generally have a relatively low melting temperature within the recommended range of operation for Li-ion cells.

In accordance with a preferred practice of this embodiment of the invention, the housing 112 also contains a heat-conductive containment lattice member 164 such as desirably fills or is otherwise appropriately contained or positioned within the battery module voids 160. The heat-conductive containment lattice member 164 is perhaps best viewed making reference to FIG. 11.

The containment lattice member 164 desirably includes a plurality of openings or pores 166, the use of which will be described in greater detail below. The containment lattice member 164 is desirably formed of a heat-conductive material such as of metal, graphite or a composite thereof, for example. Particular preferred containment lattice member materials for use in the practice of the invention include, for example, various screen and foam materials such as graphite foam and metal foams such as aluminum foam and particularly open-celled forms of such foams, for example.

As identified above, the containment lattice member 164 desirably includes a plurality of openings or pores 166. In accordance with a preferred practice of the invention, at least a portion of the phase change material supply 162 is disposed in the openings 166 of the containment lattice member 164.

As will be appreciated by those skilled in the art and guided by the teachings herein provided, such battery module inclusion of a containment lattice member in accordance with the invention can desirably serve to more uniformly distribute heat generated upon a charge or discharge of electric power from the electrochemical cell elements as compared to an otherwise identical battery module without the containment lattice member. In accordance with a preferred embodiment of the invention, the containment lattice member has a thermal conductivity which is an order of magnitude greater than the thermal conductivity of the phase change material. In one particular preferred embodiment it has been found desirable that the containment lattice member have a thermal conductivity of at least about 10 $W \cdot m^{-1} \cdot K^{-1}$.

The battery module 110 includes a plurality of protruding heat transfer fins 170. More particularly, such heat transfer fins 170 outwardly-extend from the housing 112. Such heat transfer fins can typically be constructed or formed of a relatively light weight formable heat conducting metal such as aluminum or the like. As will be appreciated, however, such heat transfer fins 170 can be variously formed or constructed such as suitably joined or connected to the housing 112 or, as may be preferred, suitably joined or attached to the containment lattice member 164 such as to be in thermal communication therewith. As will be appreciated by those skilled in the art and guided by the teachings herein provided, various form or constructions of heat transfer fins can be utilized or incorporated in the practice of the invention and the broader practice of the invention is not necessarily limited to use of or practice with particular forms or types of heat transfer fins.

As will be appreciated by those skilled in the art and guided by the teachings herein provided, the presence or inclusion of such heat transfer fins or the like facilitate the utilization of external active cooling wherein a selected cooling medium (e.g., such as based on forced circulation of air, liquid or other selected cooling medium) is circulated externally to the battery module 110 such as via a fan (not shown), for example.

While the broader practice of the invention is not necessarily limited to the use of or practice with containment lattice members which contain or include a certain porosity, it has been found to be generally preferred that containment lattice members employed in the practice of the invention desirably contain or include a porosity or open volume of at least 20%. As will be appreciated, higher porosities permit or allow for higher loading of the phase change material therein.

It has been found generally desirable to dispose a quantity of an electric insulator 174 about each of the cell elements 114 to minimize or avoid undesired electrical contact by and between the electrochemical cell elements 114 and the containment lattice member 164. Various insulator materials, such as various plastics, such as known in the art can be employed in the practice of the invention. It is to be understood that the broader practice of the invention is not necessarily limited to the use or practice with particular insulator materials.

While this embodiment of the invention has been described making specific reference to Li-ion cells, it is to be understood that various suitable cell elements can be used in the practice of such embodiment including rechargeable cell elements and fuel cell batteries such as utilize or employ hydrogen or methanol as a fuel, for example.

Figure 12:
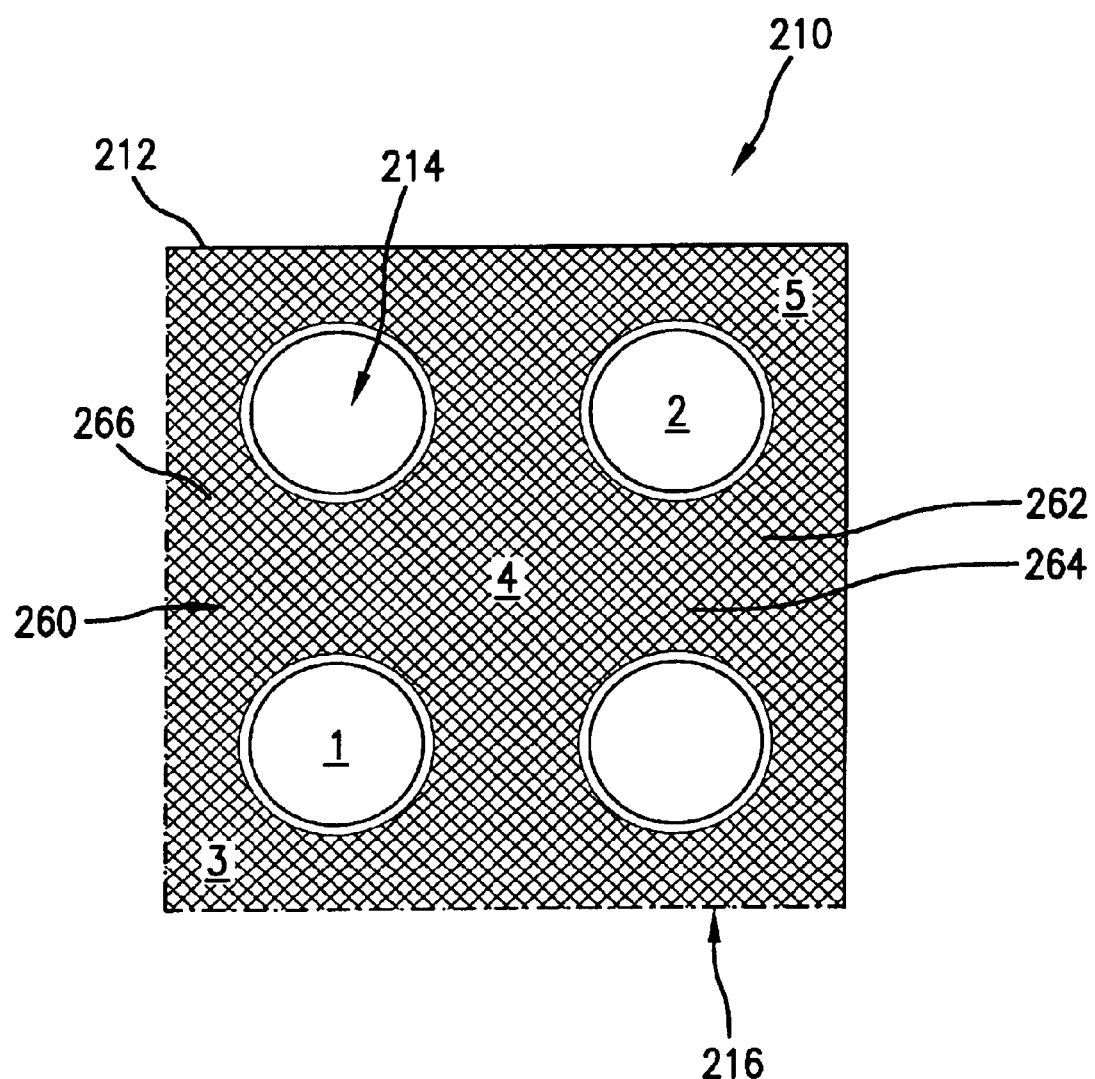
FIG. 12 is a top view schematic of a battery module quadrant, similar to that shown in FIG. 10 but now of a battery module in accordance with another embodiment of the invention.

Further, while the invention has been described above making reference to the battery module 110 which includes a plurality of protruding heat transfer fins 170, it will be appreciated that in some applications it may be desirable to employ an embodiment without such heat transfer fins. For example, FIG. 12 illustrates for a battery module 210, a module quadrant 216 generally similar to the module quadrant 116 described above but now without the presence or inclusion of heat transfer fins. The battery module 210 includes a housing 212 and a plurality of electrochemical cell elements, generally designated by the reference numeral 214, housed or contained within the module housing 212.

As in the above-described embodiment, the battery module 210 forms or includes void spaces, generally designated by the reference numeral 260, between the various cell elements 214. Such battery module voids 260 house or contain a heat-conductive containment lattice member 264. The containment lattice member 264 desirably includes a plurality of openings or pores 266 wherein disposed or contained is a suitable phase change material (PCM), generally designated by the reference numeral 262 and such as above-described.

Figure 13:
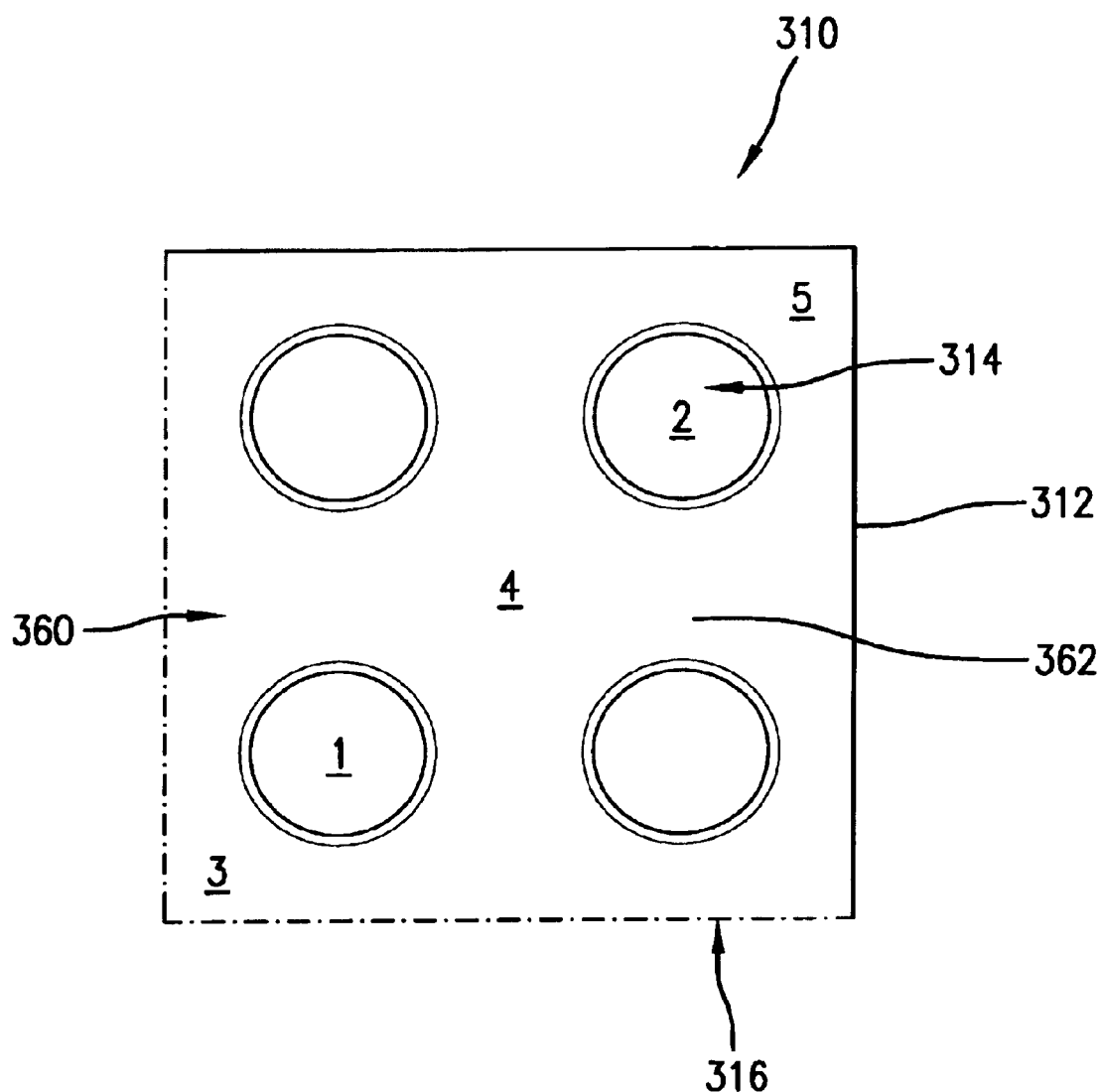
FIG. 13 is also a top view schematic of a battery module quadrant, similar to that shown in FIG. 10 but now of yet another battery module in accordance with the invention.

FIG. 13 illustrates for a battery module 310, a module quadrant 316 generally similar to the module quadrant 116 described above but now without the presence or inclusion of heat transfer fins or a heat-conductive containment lattice member wherein a phase change material (PCM) is disposed.

The battery module 310 includes a housing 312 and a plurality of electrochemical cell elements, generally designated by the reference numeral 314, housed or contained within the module housing 312.

As in above-described embodiments, the battery module 310 forms or includes void spaces, generally designated by the reference numeral 360, between the various cell elements 314. Such battery module voids 360 house or contain the phase change material (PCM), generally designated by the reference numeral 362, such as above-described.

The present invention is described in further detail in connection with the following examples which illustrate or simulate various aspects involved in the practice of the invention. It is to be understood that all changes that come within the spirit of the invention are desired to be protected and thus the invention is not to be construed as limited by these examples.

EXAMPLES

For purposes of these simulation examples, battery module quadrants corresponding to those shown and described above relative to FIGS. 11, 12 and 13 were evaluated at four selected cooling rates, e.g., h=0, 10, 50 and 100 W·m$^{-1}$·K$^{-1}$, respectively, with temperature measurements at the locations designated "1", "2", "3", "4" and "5", as shown on FIGS. 11, 12 and 13, respectively. As shown, the point or location designated "1" is a cell present on the inner side or region of the module. The point or location designated "2" is a cell present on the outer side or region of the module. The point or location designated "4" correspond to the center or central region of the respective module quadrant.

In each case:

a. each of the four electrochemical cells were Li-ion cells each having a capacity of 1.8 Ah with a diameter (corresponding to D shown in FIG. 2) of 18 mm and a height or length (corresponding to L shown in FIG. 2) of 65 mm. The four cells in each of the module quadrants are connected in series and the four quadrants are in turn connected in parallel to provide or result in a total nominal capacity of 7.2 Ah and a total nominal voltage of 14.68 V;

b. the PCM was paraffin wax having a solid phase thermal conductivity of 0.29 W·m$^{-1}$·K$^{-1}$ and a liquid phase thermal conductivity of 0.21 W·m$^{-1}$·K$^{-1}$; and c. for the embodiments corresponding to FIGS. 11 and 12, the heat-conductive containment lattice member was aluminum foam having a thermal conductivity of 218 W·m$^{-1}$·K$^{-1}$.

Results and Discussion

TABLES 2–5, below, summarize the temperature effects of the inclusion of the aluminum foam lattice member in the embodiment shown in FIG. 12 and the effect of the inclusion of both the aluminum foam lattice member and aluminum heat transfer fins in the embodiment shown in FIG. 11.

TABLE 2

| Cooling Rate - h | Temperature Rise at Point 1 (° C.) | | |
|---|---|---|---|
| W · m$^{-2}$ · K$^{-1}$ | FIG. 11 | FIG. 12 | FIG. 13 |
| 0 | 33.57 | 41.29 | 49.4 |
| 10 | 21.64 | 36.21 | 49.06 |
| 50 | 10.39 | 23.76 | 48.56 |
| 100 | 7.51 | 17.74 | 48.38 |

TABLE 3

| Cooling Rate - h | Temperature Rise at Point 2 (° C.) | | |
|---|---|---|---|
| W · m$^{-2}$ · K$^{-1}$ | FIG. 11 | FIG. 12 | FIG. 13 |
| 0 | 33.47 | 41.29 | 49.4 |
| 10 | 20.78 | 35.61 | 44.32 |
| 50 | 8.96 | 21.25 | 38.62 |
| 100 | 5.94 | 14.58 | 36.91 |

TABLE 4

| Cooling Rate - h | ΔT between Point 1 and Point 2 (° C.) | | |
|---|---|---|---|
| W · m$^{-2}$ · K$^{-1}$ | FIG. 11 | FIG. 12 | FIG. 13 |
| 0 | 0.1 | 0 | 0 |
| 10 | 0.86 | 0.6 | 4.74 |
| 50 | 1.43 | 2.51 | 9.94 |
| 100 | 1.57 | 3.16 | 11.47 |

TABLE 5

| Cooling Rate - h | Temperature Rise at Point 4 (° C.) | | |
|---|---|---|---|
| W · m$^{-2}$ · K$^{-1}$ | FIG. 11 | FIG. 12 | FIG. 13 |
| 0 | 12.36 | 13.13 | 12.06 |
| 10 | 11.14 | 12.59 | 11.89 |
| 50 | 5.36 | 11.26 | 11.68 |
| 100 | 3.71 | 8.93 | 11.62 |

As shown by TABLES 2–5, inclusion of the containment lattice member and heat transfer fins, in accordance with the invention have a significant effect in improving heat transfer characteristics within a battery module, increasing or improving the dissipation of heat from the cells of the battery module and in helping maintain cell temperatures within prescribed limits.

More particularly, TABLE 2 relates to the temperature rise of the cell at point 1 and compares the effects of cooling rate, heat-conductive containment lattice member and heat transfer fins on the temperature rise at the point 1.

The column for FIG. 13 summarizes the temperature rise at point 1 at different external cooling rates for the embodiment with the inclusion of the phase change material but without either a containment lattice member and heat transfer fins. Since the cell at location 1 is present in the inner region of the module, changes in the external cooling rate do not have a significant impact on the temperature at this location. Hence, due to the generally poor thermal conductivity of the phase change material, the temperature rise at location 1 remains near constant under the different external cooling conditions The column for FIG. 12 summarizes the temperature rise at point 1 at different external cooling rates for the embodiment with the inclusion of the phase change material and the containment lattice member but without heat transfer fins. As shown, the temperature rise at point 1 for the embodiment shown in FIG. 12 was significantly lower than that for the embodiment shown in FIG. 13, with the temperature rise being more significantly reduced at higher external cooling rates.

The column for FIG. 11 summarizes the temperature rise at point 1 at different external cooling rates for the embodiment with the inclusion of the phase change material, the containment lattice member and the heat transfer fins. As shown, the temperature rise at point 1 for the embodiment shown in FIG. 11 was further significantly reduced as compared to that for the embodiments shown in FIGS. 12 and 13, respectively, with the temperature rise being more significantly reduced at higher external cooling rates.

Thus, TABLE 2 highlights improvements in heat dissipation from module cells obtainable though the practice of the invention.

TABLE 3 relates to the temperature rise of the cell at point 2 and compares the effects of cooling rate, heat-conductive containment lattice member and heat transfer fins on the temperature rise at the point 2.

The column for FIG. 13 summarizes the temperature rise at point 2 at different external cooling rates for the embodiment with the inclusion of the phase change material but without either a containment lattice member and heat transfer fins. Since the cell at location 2 is present in the outer region of the module, changes in the external cooling rate impact the temperature rise at this location as compared to that shown in TABLE 2 for point 1.

The column for FIG. 12 summarizes the temperature rise at point 2 at different external cooling rates for the embodiment with the inclusion of the phase change material and the containment lattice member but without heat transfer fins. As shown, the temperature rise at point 2 for the embodiment shown in FIG. 12 was significantly lower than that for the embodiment shown in FIG. 13, with the temperature rise again being more significantly reduced at higher external cooling rates.

The column for FIG. 11 summarizes the temperature rise at point 2 at different external cooling rates for the embodiment with the inclusion of the phase change material, the containment lattice member and the heat transfer fins. As shown, the temperature rise at point 2 for the embodiment shown in FIG. 11 was further significantly reduced as compared to that for the embodiments shown in FIGS. 12 and 13, respectively, with the temperature rise again being more significantly reduced at higher external cooling rates.

As will be appreciated, temperature uniformity of module cells is a key to securing improved cell performance, extended cell life and greater uniformity in power distribution from the cells.

TABLE 4 highlights the effect of the heat-conductive containment lattice member and the heat transfer fins on maintaining temperature uniformity, under different external cooling rates.

The column for FIG. 13 summarizes the temperature difference between the cells at points 1 and 2, respectively, at different external cooling rates for the embodiment with the inclusion of the phase change material but without either a containment lattice member and heat transfer fins. As shown, there is a large difference in the temperature of the cells at points 1 and 2 and this difference is more pronounced with increases in the external cooling rate.

The column for FIG. 12 summarizes the temperature difference between the cells at points 1 and 2, respectively, at different external cooling rates for the embodiment with the inclusion of the phase change material and the containment lattice member but without heat transfer fins. As shown, this embodiment exhibited improved temperature uniformity as compared to the embodiment of FIG. 13.

The column for FIG. 11 summarizes the temperature difference between the cells at points 1 and 2, respectively, at different external cooling rates for the embodiment with the inclusion of the phase change material, the containment lattice member and the heat transfer fins. As shown, such an embodiment permits temperature uniformity between the cells at points 1 and 2 to be desirably maintained even under application of different external cooling rates.

TABLE 5 relates to the temperature rise of the phase change material situated at the point or location designated "4" corresponding to the center or central region of a respective module quadrant, under different external cooling rates.

The column for FIG. 13 summarizes the temperature rise at point 4 at different external cooling rates for the embodiment with the inclusion of the phase change material but without either a containment lattice member and heat transfer fins. In this case, the phase change material is in the melting region in the case of each of the external cooling rates.

The column for FIG. 12 summarizes the temperature rise at point 4 at different external cooling rates for the embodiment with the inclusion of the phase change material and the containment lattice member but without heat transfer fins. In this case, the phase change material is in the melting region for the 0, 10 and 50 $W \cdot m^{-2} \cdot K^{-1}$ cooling rates but in the case of the 100 $W \cdot m^{-2} \cdot K^{-1}$ cooling rate, the phase change material has not reached its melting temperature as most of the heat has been dissipated to the surroundings via the containment lattice member.

The column for FIG. 11 summarizes the temperature rise at point 4 at different external cooling rates for the embodiment with the inclusion of the phase change material, the containment lattice member and the heat transfer fins. The phase change material is in the melting region for the lower cooling rates. However, with application of higher external cooling rates, the phase change material has or provides additional capacity to store heat generated by the cells. Thus, with such an embodiment, the cells can be scaled-up relative to the amount of the phase change material provided the higher cooling rates are maintained.

Various applications of the invention are contemplated including, for example, applications in conjunction with battery power supply systems (e.g., Li-ion battery or the like) such as used for or with space satellites. For example, as a satellite is orbiting the earth, such a satellite typically goes through a sudden temperature change when it moves from the light side to the dark side of the earth. Such a sudden drop in temperature can affect the performance of the battery. Through application and practice of the invention, heat stored in the battery pack, via a suitable phase change material, can be used to decrease the effect of such a sudden temperature change.

As will be appreciated, power supply systems and methods of operation such as described above are capable of application in various contexts. In view thereof, the broader practice of the invention is not necessarily limited to practice or use in conjunction with a specific or particular context. As currently contemplated, however, the invention may find particular applicability or suitability for use in or in conjunction with battery packs, such as include or incorporate a plurality of Li-ion cell or batteries, such as may find application or use to power electric vehicles (EV). Other useful applications for the practice of the invention include in battery modules or packs for use as a power supply for personal electronic devices such as cell phones, lap top computers, camcorders or the like as well as applications of battery power extended to include "fuel batteries" or "fuel cell batteries", in which a fuel cell reaction is used to generate electric power in a manner somewhat similar to that of a conventional rechargeable battery, but in which one of the reactants (such as using hydrogen or methanol, for example, as a fuel) must be replenished from time to time.

Thus, the invention provides a power supply system and method of operation which provides or results in improved thermal management. In particular, the invention provides a power supply system and method of operation which are either or both more effective and efficient than otherwise previously realizable. Further, the invention desirably provides a thermal management system such as can desirably better ensure one or more of the performance, safety or capacity of an associated power supply. At least partially as a result thereof, practice of the invention may more conveniently or effectively permit the use of larger-sized battery power supplies such as contemplated or envisioned for certain applications, such as to power electric vehicles, for example.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A battery module comprising:
   a housing;
   a plurality of electrochemical cell elements contained within the housing, the electrical cell elements capable of a heat-generating charge;
   a supply of a phase change material also contained within the housing and in thermal contact with at least one of the plurality of electrochemical cell elements whereby the phase change material absorbs at least a portion of the heat generated upon a charge or discharge of electric power from the at least one of the plurality of electrochemical cell elements, the phase change material having a thermal conductivity; and
   a heat-conductive containment lattice member also contained within the housing, the containment lattice member having a plurality of openings wherein at least a portion of the supply of the phase change material is disposed.

2. The battery module of claim 1 wherein the heat generated upon a charge or discharge of electric power from the at least one of the plurality of electrochemical cell elements is more uniformly distributed throughout the battery module as compared to an otherwise identical battery module without the containment lattice member.

3. The battery module of claim 1 wherein the containment lattice member has a thermal conductivity and wherein the thermal conductivity of the containment lattice member is an order of magnitude greater than the thermal conductivity of the phase change material.

4. The battery module of claim 3 wherein the thermal conductivity of the containment lattice member is greater than $10 \text{ W·m}^{-1}\text{·K}^{-1}$.

5. The battery module of claim 1 wherein the containment lattice member comprises graphite.

6. The battery module of claim 5 wherein the containment lattice member is a graphite foam.

7. The battery module of claim 1 wherein the containment lattice member comprises a metal graphite composite.

8. The battery module of claim 1 wherein the containment lattice member comprises a metal.

9. The battery module of claim 8 wherein the metal is aluminum.

10. The battery module of claim 9 wherein the containment lattice member is an aluminum foam.

11. The battery module of claim 10 wherein the aluminum foam is open-celled and has a porosity of at least 20%.

12. The battery module of claim 1 wherein the containment lattice member is a foam.

13. The battery module of claim 1 wherein the containment lattice member is a screen.

14. The battery module of claim 1 additionally comprising a quantity of insulation electrically insulating the containment lattice member from the plurality of the electrochemical cell elements.

15. The battery module of claim 1 wherein at least one of the plurality of the cell elements is rechargeable.

16. The battery module of claim 1 wherein at least one of the plurality of the cell elements comprises a Li cell.

17. The battery module of claim 1 wherein at least one of the plurality of the cell elements comprises a fuel cell battery.

18. The battery module of claim 17 wherein the fuel cell battery utilizes hydrogen fuel.

19. The battery module of claim 17 wherein the fuel cell battery utilizes methanol fuel.

20. The battery module of claim 1 additionally comprising a plurality of heat transfer fins protruding from the housing.

21. A method of operating a power supply system, the method comprising:
   discharging at least one cell element of a battery module to produce a quantity of power and a quantity of heat,
   absorbing at least a portion of the quantity of heat in a phase change material in thermal contact with the discharging cell element with the phase change material disposed in a plurality of openings in a heat-conductive containment lattice member,
   following discharge, releasing at least a portion of the absorbed quantity of heat from the phase change material to heat the at least one cell element to a greater than ambient temperature, and
   subsequently discharging the heated at least one cell element.

22. The method of claim 21 wherein the phase change material changes from a solid phase to a liquid phase during the absorbing step and from a liquid phase to a solid phase during the releasing step.

23. The method of claim 21 wherein the at least one cell element is one of a plurality of cell elements in a preselected configuration.

24. The method of claim 23 wherein the at least one cell element is discharged in parallel with at least another of the plurality of cell elements.

25. The method of claim 23 wherein the at least one cell element is discharged in series with at least another of the plurality of cell elements.

26. The method of claim 21 wherein at least a portion of the quantity of power is supplied to power an electric vehicle.

27. The method of claim 21 wherein at least a portion of the quantity of power is supplied to power a personal electric device.

28. The method of claim 21 additionally comprising the step of forced circulating a cooling medium externally to the battery module.

29. The method of claim 28 wherein the battery module includes a plurality of protruding heat transfer fins.

* * * * *